United States Patent
Roether et al.

(10) Patent No.: US 7,059,688 B2
(45) Date of Patent: Jun. 13, 2006

(54) ELECTROPNEUMATIC CONTROL VALVE COMPRISING A GUIDE ARRANGEMENT FOR A CONTROL PISTON

(75) Inventors: Friedbert Roether, Cleebronn (DE); Joachim Delfs, Hemmingen (DE); Siegmund Deja, Freiberg (DE); Eberhard Schaffert, Leonberg (DE); Günther Strobel, Ditzingen (DE); Hans Haecker, Leonberg (DE); Martin Judith, Bietigheim-Bissingen (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/475,666

(22) PCT Filed: Apr. 26, 2002

(86) PCT No.: PCT/EP02/04627

§ 371 (c)(1),
(2), (4) Date: May 17, 2004

(87) PCT Pub. No.: WO02/087947

PCT Pub. Date: Nov. 7, 2002

(65) Prior Publication Data

US 2004/0195913 A1    Oct. 7, 2004

(30) Foreign Application Priority Data

Apr. 26, 2001 (DE) .................. 101 20 321

(51) Int. Cl.
*B60T 8/34* (2006.01)
(52) U.S. Cl. .................. 303/118.1; 137/627.5
(58) Field of Classification Search ........... 303/118.1, 303/119.1, 119.2, 119.3; 137/627.5
See application file for complete search history.

(56) References Cited

U.S. PATENT DOCUMENTS

| | | | | |
|---|---|---|---|---|
| 3,920,046 A | * | 11/1975 | Morse et al. | 137/627.5 |
| 4,126,152 A | * | 11/1978 | Kirk | 137/627.5 |
| 4,493,510 A | * | 1/1985 | Deike et al. | 137/627.5 |
| 5,277,484 A | | 1/1994 | Kiel | 303/118.1 |
| 6,206,481 B1 | * | 3/2001 | Kaisers et al. | 303/118.1 |
| 6,238,013 B1 | * | 5/2001 | Koelzer | 303/118.1 |
| 6,247,764 B1 | * | 6/2001 | Koelzer | 303/118.1 |
| 6,325,468 B1 | * | 12/2001 | Ho et al. | 303/118.1 |
| 6,792,971 B1 | * | 9/2004 | Roether et al. | 137/627.5 |

FOREIGN PATENT DOCUMENTS

| | | |
|---|---|---|
| DE | 3931761 A | 4/1991 |
| DE | 4136244 A | 5/1993 |
| DE | 19605562 A | 8/1997 |
| DE | 19609222 A | 9/1997 |
| EP | 1022204 A | 7/2000 |

\* cited by examiner

Primary Examiner—Robert A. Siconolfi
(74) Attorney, Agent, or Firm—Crowell & Moring LLP

(57) ABSTRACT

Electropneumatic control valve for a pneumatic brake system of a vehicle having a relay valve housing in which an axially adjustable control piston is arranged for actuating a valve seat arrangement which switches the compressed-air flow between at least one exterior brake line connection, a supply pressure connection and a bleeder connection. The control piston is axially guided by means of a coaxial guiding arrangement. The guiding arrangement comprises a separate guiding sleeve which is stationarily fastened to the pilot valve housing and which is provided with an upper guiding section which, for the axial guidance, corresponds with a passage bore in the control piston, and which, in addition, has a lower tube section of a smaller outside diameter adjoining the upper guiding section in order to guide the outgoing air flowing through an integrated axial bleeder duct directly to the bleeder connection.

22 Claims, 2 Drawing Sheets

ELECTROPNEUMATIC CONTROL VALVE COMPRISING A GUIDE ARRANGEMENT FOR A CONTROL PISTON

This application claims the priority of German application 101 20 321.7, filed Apr. 26, 2001, the disclosure of which is expressly incorporated by reference herein.

BACKGROUND AND SUMMARY OF THE INVENTION

The invention relates to an electropneumatic control valve for a pneumatic brake system of a vehicle.

The electropneumatic valve of the present invention has a relay valve housing in which an axially adjustable control piston is arranged for actuating a valve seat arrangement which switches the compressed-air flow between at least one exterior brake line connection, a supply pressure connection and a bleeder connection. The control piston of the control valve is axially guided by means of a guiding arrangement and can be acted upon by a control pressure by way of at least one electromagnetic pilot valve for the axial adjustment. The pilot valve is accommodated in a pilot valve housing connected with the relay valve housing. The present invention specifically relates to a special constructive design of the guiding arrangement of the control piston.

A control valve of the above-mentioned type is used within a pneumatic brake system of a vehicle in order to control a brake pressure corresponding to the desired braking effect. For this purpose, a brake line originating from the control valve is usually connected with a brake cylinder at the vehicle wheel, which brake cylinder generates the braking force required for the braking of the vehicle wheel for a disk or drum brake connected thereto. The defining of the desired pressure value for the electropneumatic control valve can take place electrically as well as pneumatically. However, the pneumatic control is mostly utilized only for safety purposes in the event of a failure of the electric control.

An electropneumatic control valve of this type is known from German Patent Document DE 39 31 761 C2. The control valve has a large-surface control piston which is accommodated in an axially displaceable manner inside a cylindrical hollow space of a relay valve housing. The control piston separates the hollow space into a control chamber and into a working chamber. In the case of the working chamber, a coaxial hollow pin is constructed on the control piston, which hollow pin is used for actuating an adjacent valve seat arrangement. By means of an axial adjustment of a spring-braced valve tube, the valve seat arrangement switches the compressed-air flow between an exterior brake line connection, a supply pressure connection as well as a bleeder connection.

By means of a pilot valve arrangement, the control piston can be acted upon by a control pressure on the control chamber. The pilot valve arrangement consists of two electropneumatic pilot valves which, by means of a coordinated energizing of the integrated electric coils, cause a rising, maintaining or lowering of the control pressure within the control chamber in order to implement the desired movement of the control piston while interacting with the restoring spring arranged on the opposite side of the control piston.

The axial guidance required because of the large-surface characteristic of the control piston is achieved here by way of a coaxial guide bore in the pilot valve housing, which guide bore corresponds with a guiding pin coaxially shaped to the control piston.

However, this type of guidance has the disadvantage that the guide bore in the pilot valve housing must be produced in a highly precise manner and with a high surface quality in order to avoid a jamming or tilting of the control piston within the cylindrical hollow space during the operation. Furthermore, this known guiding arrangement causes a relatively complicated shaping of the control piston whose production therefore requires high expenditures. This applies particularly also to the making of the passage bore which extends coaxially through the control piston and is used for discharging outgoing air from the control chamber to the bleeder connection. Here, the passage bore has a relatively large diameter in order to permit a fast bleeding of the control chamber.

In practice, it has been attempted to design a guiding arrangement for the control piston according to another, constructively simpler principle, which is known from German Patent Document DE 196 05 562 A1. In that case, a sleeve is used for the guidance, which sleeve is joined into a suitable coaxial recess of the pilot valve. By way of the outside diameter of the sleeve projecting from the pilot valve housing in this manner, the control piston is guided by way of a corresponding coaxial passage bore for this purpose.

The fastening of the sleeve on the pilot valve housing takes place with a radial play and/or swivel play for the compensation of a production-caused play between the control piston and the pilot valve housing. However, this type of guidance of the control piston results in a deterioration of the guiding characteristics because a tilting of the control piston becomes possible as a result of the swivel play and/or radial play.

Furthermore, the guiding principle applied here requires a small space for the passage bore for discharging the outgoing air from the control chamber. To this extent, only a comparatively small effective cross-section is possible.

It is therefore an object of the present invention to improve an electropneumatic control valve of the above-described type such that a precise guiding of the control piston can be carried out with an effective integrated guiding of outgoing air at low manufacturing expenditures.

The object is achieved by an electropneumatic control valve of the present invention having a relay valve housing in which an axially adjustable control piston is arranged for actuating a valve seat arrangement which switches the compressed-air flow between at least one exterior brake line connection, a supply pressure connection and a bleeder connection. The control piston is axially guided by means of a coaxial guiding arrangement and capable of being acted upon by a control pressure by way of at least one electromagnetic pilot valve for the axial adjustment. The pilot valve is accommodated in a pilot valve housing connected with the relay valve housing. The guiding arrangement of the control piston comprises a separate guiding sleeve which is stationarily fastened to the pilot valve housing and which is provided with an upper guiding section which, for the axial guidance, corresponds with a passage bore in the control piston, and which, in addition, has a lower tube section of a smaller outside diameter adjoining the upper guiding section in order to guide the outgoing air flowing through an integrated axial bleeder duct over the area of the valve seat arrangement directly to the bleeder connection.

The invention includes the technical teaching that the guiding arrangement of the control piston consists of a separate guiding sleeve which is fastened to the pilot valve housing and which is provided with an upper guiding section which, for the axial guidance, corresponds with a passage bore in the control piston and which, in addition, has a lower tube section of a smaller outside diameter which adjoins the upper guiding section in order to guide the outgoing air flowing through an integrated axial bleeder duct over the area of the valve seat arrangement directly to the bleeder connection.

The advantage of the invention is particularly the special further development of the guiding sleeve to be used, which provides a precise guiding function for the control piston as well as an effective outgoing-air guidance. Because of the particularly long bleeder duct which extends directly to the bleeder connection over the area of the valve seat arrangement, the opening of the bleeder duct arrives in an area of a lower ram pressure, whereby, because of the low existing counterpressure in the proximity of the bleeder connection, a bleeding of the control chamber is achieved which is faster despite the relative small diameter of the bleeder duct. Surprisingly, the tube section situated in the outgoing-air flow of the working chamber results in an extreme noise reduction during the bleeding of the brake line.

In order to further minimize the noise caused by the outflowing air at the electropneumatic control valve, a sound absorber can, in addition, be mounted on the bleeder connection. In cooperation with the sound absorber, the distal end of the tube section of the guiding sleeve has a fissured construction in order to ensure a free flowing-out of the outgoing air from the bleeder duct. As a result of this arrangement, a very low noise level is achieved on the whole which meets even strict requirements with respect to a control valve of the above-mentioned type.

Preferably, the guiding sleeve according to the invention, at least in the area of the guiding section, consists of a plastic material with a low sliding friction coefficient. As a result, a low sliding friction is achieved which is favorable for the axial guidance because the control piston, as a friction partner, preferably is also produced of a plastic material. It is also conceivable to use different pairings of material. The corresponding passage bore in the control piston, to this extent, can also be equipped with a Teflon bush or the like.

According to another embodiment of the invention, a guide pin formed in the pilot valve housing is provided for fastening the guiding sleeve, in which case, by way of a force-locking press fit, a connection with the guiding sleeve is established. Corresponding with the guide pin, in the area of the guiding section, the guiding sleeve preferably has a cylindrical recess of a larger diameter, which extends essentially coaxially with respect to the bleeder duct, by means of which recess, the fastening takes place by a pressing onto the guide pin. Since it is sufficient in this case to provide only two axially spaced, ring-shaped fitting sections inside the recess, which fitting sections come to rest on the guide pin, because of the minimized pressing-on force, this pressing-on can also take place manually. In addition, the two spaced ring-shaped fitting sections ensure a precise positioning of the guiding sleeve with respect to the guide pin.

According to another advantageous embodiment of the guiding sleeve, a step is constructed in the distal end area of the tube section in order to permit an end-side form-locking fixing of the guiding sleeve in a stationary manner with respect to the relay valve housing. As a result, despite the large length, the guiding sleeve is securely fixed inside the relay valve housing at both ends, specifically in the upper area of the recess as well as in the lower area of the opening of the bleeder duct.

In order to permit a particularly fast flowing of the outgoing air out of the bleeder duct, it is advantageous for the flow cross-section of the bleeder duct to be maximal. However, a minimal required wall thickness of the tube section should be retained in order to ensure a sufficient stability of the tube section. The outside diameter of the tube section, in turn, is limited by a minimally required ring gap for the outgoing air from the brake line when the latter is bled. In order to meet all these requirements, the wall of the tube section can additionally be reinforced by a ring arrangement, so that the required wall thickness as well as the overall diameter of the tube section can be kept as small as possible and a sufficient stability is nevertheless achieved. The rib arrangement preferably consists of several shaped-on ribs extending axially along the outside wall of the tube section. The shaped-on ribs are aligned essentially axially parallel with respect to the tube section and, in the cross-sectional view, are arranged at an equal distance from one another. The result is therefore a star-type shape in a cross-sectional view.

Other objects, advantages and novel features of the present invention will become apparent from the following detailed description of the invention when considered in conjunction with the accompanying drawings.

DETAILED DESCRIPTION OF THE DRAWINGS

Figure 1:
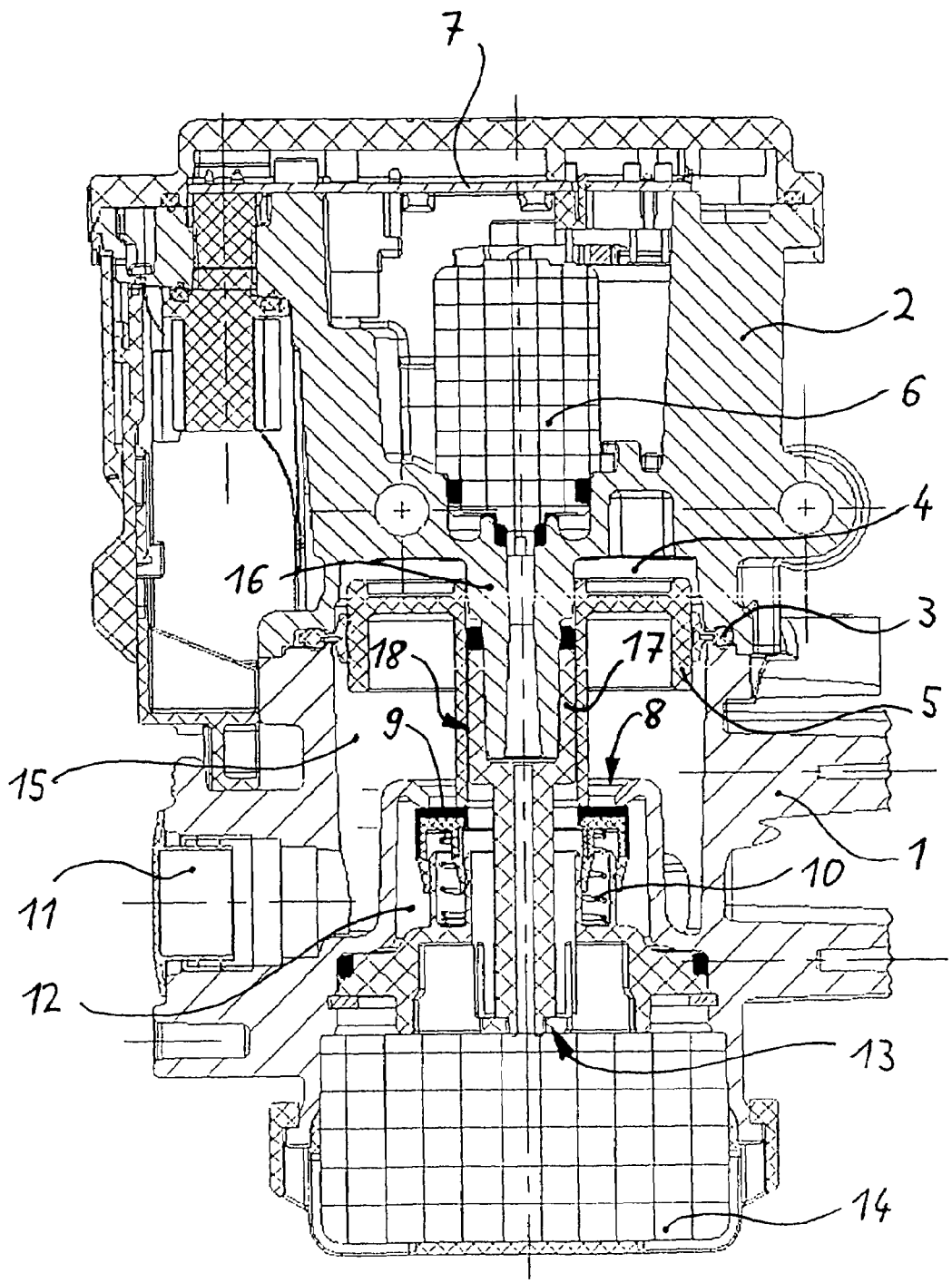
FIG. 1 is a longitudinal sectional view of an electropneumatic control valve with a guiding arrangement for the interior control piston according to one embodiment of the invention.

The electropneumatic control valve according to FIG. 1 has a housing arrangement which is essentially constructed in two parts and which consists of a lower relay valve housing 1 which is connected with an upper pilot valve housing 2, with sealing element 3 situated in-between. The connection takes place by means of a (not shown) screwed connection. The relay valve housing 1 and the pilot valve housing 2 enclose an interior control chamber 4 in which a control piston 5 is axially movably arranged. For the axial adjustment of the control piston 5, a pilot valve arrangement is used which is accommodated in the pilot valve housing 2 and of which only a pilot valve 6 is illustrated here. The pilot valve arrangement is electrically controlled here by means of an electronic unit. The illustrated pilot valve 6 is used as an outlet valve and, when operated, bleeds the control chamber 4, in which case the outgoing air is discharged to the atmosphere. In addition, a second pilot valve (not shown) exists which is the inlet valve and which is used for acting upon the control chamber 4 by means of a control pressure in order to move the control piston 5.

When acting upon the control chamber 4, the control piston 5 actuates a valve set arrangement 8 by way of a lower sleeve-type extension. The valve seat arrangement 8 essentially consists of a closing element 9 which, by means of the force of a restoring spring 10, is pressed against two concentrically arranged adjacent valve seats. By means of the latter, the compressed-air flow can be switched between a brake line connection 11 arranged on the relay valve housing 1, on the one hand, a supply pressure connection (not visible here)—which is connected with an internal supply pressure chamber 12- and a bleeder connection 13, on the other hand. The bleeder connection 13 is additionally provided with a sound absorber 14 for reducing noise.

The electropneumatic control valve is illustrated here in its closed-off switching position. When the control chamber 4 is acted upon by means of a control pressure and during the subsequent movement of the control piston 5 in the direction of a lower position, a compressed-air flow takes place by opening the exterior valve seat of the valve seat arrangement 8, originating from the supply pressure chamber 12 to a working chamber 15, which leads in at the brake line connection 11 in order to thereby increase the brake pressure.

During a bleeding of the control chamber 4, the control piston 5 is changed into an upper position, in which case the interior valve seat of the valve seat arrangement 8 is opened, so that, originating from the brake line connection 11, compressed air arrives at the bleeder connection 13 by way of the working chamber 15 in order to correspondingly lower the brake pressure. As a result, the brake pressure is influenced by a reciprocal movement of the control piston 5. In the central closed-off switching position, no compressed-air flow takes place.

The large-surface control piston 5 is axially guided by way of a coaxial guiding arrangement. The guiding arrangement of the control piston 5 consists of a guiding sleeve 17 mounted on a guide pin 16 of the pilot valve housing 2, which guiding sleeve 17 slidingly interacts with a central passage bore 18 in the control piston 5 while forming an axial guide.

Figure 2:
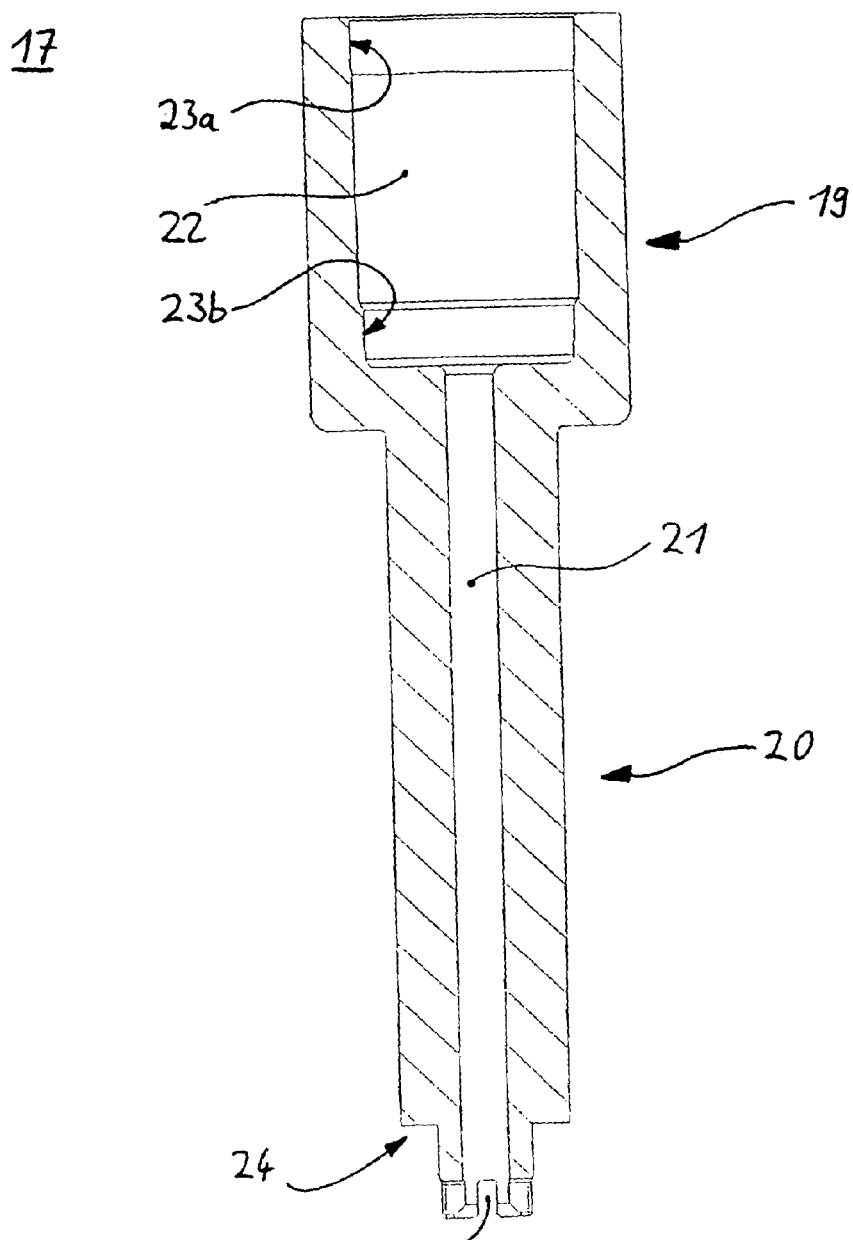
FIG. 2 is a longitudinal sectional view of the guiding sleeve used in the case of the guiding arrangement illustrated in FIG. 1.

As illustrated in detail in FIG. 2, the guiding sleeve 17 consists of an upper guiding section 19, which is coaxially adjoined by a lower tube section 20. With respect to the guiding section 19, the lower tube section 20 is constructed with a smaller outside diameter. The guiding sleeve 17 is constructed in one piece and is produced of a plastic material by means of injection molding. A bleeder duct 21 extends coaxially through the guiding sleeve 17 and guides the outgoing air occurring when the control chamber 4 (not shown here) is bled, directly to the bleeder connection 13. In the area of the guiding section 19, the bleeder duct 21 is constructed to form a recess 22 of a larger diameter. By way of the recess 22, the guiding sleeve 17 is fastened to the (not shown) hollow guide pin 16. Two axially spaced ring-shaped fitting sections 23*a* and 23*b* are provided inside the recess 22. The two fitting sections 23*a*, 23*b* come to rest directly on sections of the guide pin 16 manufactured with an accurate fit in order to ensure a precise positioning of the two components of the guiding arrangement to be mutually connected.

In the distal end area of the tube section 20, a step 24 is constructed which form-lockingly interacts with the relay valve housing 1 (not shown here) in order to position this end area of the tube section 20 in an exact manner. The end of the tube section 20 situated here is constructed to be fissured in the manner of a cross recess as a result of a groove arrangement 25 in order to permit an unhindered flowing-out of the outgoing air emerging from the bleeder duct 21.

Figure 3:
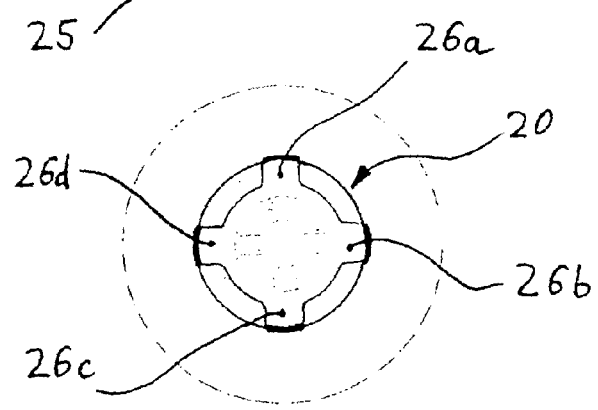
FIG. 3 is a cross-sectional view of the guiding sleeve of FIG. 1 in the area of the tube section.

According to FIG. 3, the wall of the tube section 20 is reinforced by way of a rib arrangement. Here, the rib arrangement consists of four shaped-on ribs 26*a* to 26*d* extending axially along the exterior wall of the tube section 20, which shaped-on ribs 26*a* to 26*d* are arranged at an equal mutual distance, that is, in a cross shape. By means of this rib arrangement, a sufficient stability of the tube section 20 is achieved while the flow cross-section is simultaneously maximized.

The invention is not limited to the above-indicated preferred embodiment. Modifications thereof are also conceivable which may fall into the scope of protection of the claims which follow. In particular, the invention is not limited to a two-part housing arrangement for the electropneumatic control valve. A one-part housing arrangement is also conceivable. Here, the relay valve housing and the pilot valve housing will then form sections of the one-piece housing arrangement. Likewise, a housing arrangement consisting of more than two parts is also conceivable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Electropneumatic control valve for a pneumatic brake system of a vehicle having a relay valve housing in which an axially adjustable control piston is arranged for actuating a valve seat arrangement which switches the compressed-air flow between at least one exterior brake line connection, a supply pressure connection as well as a bleeder connection, the control piston being axially guided via a coaxial guiding arrangement and being capable of being acted upon by a control pressure by way of at least one electromagnetic pilot valve for the axial adjustment, which pilot valve is accommodated in a pilot valve housing connected with the relay valve housing, wherein the guiding arrangement of the control piston comprises a separate guiding sleeve which is stationarily fastened to the pilot valve housing and which is provided with an upper guiding section which, for the axial guidance, corresponds with a passage bore in the control piston, and which, in addition, has a lower tube section of a smaller outside diameter adjoining the upper guiding section in order to guide the outgoing air flowing through an integrated axial bleeder duct over the area of the valve seat arrangement directly to the bleeder connection.

2. Electropneumatic control valve according to claim 1, wherein the bleeder connection is provided with a sound absorber in order to minimize the sound caused by the outflowing air.

3. Electropneumatic control valve according to claim 1, wherein the guiding sleeve consists of a plastic material with a low coefficient of sliding friction at least in the area of the guiding section.

4. Electropneumatic control valve for a pneumatic brake system of a vehicle having a relay valve housing in which an axially adjustable control piston is arranged for actuating a valve seat arrangement which switches the compressed-air flow between at least one exterior brake line connection, a supply pressure connection as well as a bleeder connection, the control piston being axially guided via a coaxial guiding arrangement and being capable of being acted upon by a control pressure by way of at least one electromagnetic pilot valve for the axial adjustment, which pilot valve is accommodated in a pilot valve housing connected with the relay valve housing, wherein the guiding arrangement of the control piston comprises a separate guiding sleeve which is stationarily fastened to the pilot valve housing and which is provided with an upper guiding section which, for the axial guidance, corresponds with a passage bore in the control piston, and which, in addition, has a lower tube section of a smaller outside diameter adjoining the upper guiding section in order to guide the outgoing air flowing through an integrated axial bleeder duct over the area of the valve seat arrangement directly to the bleeder connection, and for the fastening of the guiding sleeve on the pilot valve housing, a hollow guide pin is provided which is shaped thereto and which, by way of a force-locking press fit, establishes a connection with the guiding sleeve.

5. Electropneumatic control valve according to claim 4, wherein, in the area of the guiding section, the guiding sleeve has a recess of a larger diameter which extends essentially coaxial with respect to the bleeder duct, by way of which recess the fastening takes place by a pressing onto the guide pin.

6. Electropneumatic control valve according to claim 5, wherein two axially spaced ring-shaped fitting sections are provided inside the recess, which fitting sections come to rest on the guide pin during the pressing-on.

7. Electropneumatic control valve for a pneumatic brake system of a vehicle having a relay valve housing in which an axially adjustable control piston is arranged for actuating a valve seat arrangement which switches the compressed-air flow between at least one exterior brake line connection, a supply pressure connection as well as a bleeder connection, the control piston being axially guided via a coaxial guiding arrangement and being capable of being acted upon by a control pressure by way of at least one electromagnetic pilot valve for the axial adjustment, which pilot valve is accommodated in a pilot valve housing connected with the relay valve housing, wherein the guiding arrangement of the control piston comprises a separate guiding sleeve which is stationarily fastened to the pilot valve housing and which is provided with an upper guiding section which, for the axial guidance, wherein corresponds with a passage bore in the control piston, and which, in addition, has a lower tube section of a smaller outside diameter adjoining the upper guiding section in order to guide the outgoing air flowing through an integrated axial bleeder duct over the area of the valve seat arrangement directly to the bleeder connection, and a step is constructed in the distal end area of the tube section, in order to thereby permit an end-side form-locking fixing of the guiding sleeve stationarily with respect to the relay valve housing.

8. Electropneumatic control valve for a pneumatic brake system of a vehicle having a relay valve housing in which an axially adjustable control piston is arranged for actuating a valve seat arrangement which switches the compressed-air flow between at least one exterior brake line connection, a supply pressure connection as well as a bleeder connection, the control piston being axially guided via a coaxial guiding arrangement and being capable of being acted upon by a control pressure by way of at least one electromagnetic pilot valve for the axial adjustment, which pilot valve is accommodated in a pilot valve housing connected with the relay valve housing, wherein wherein the guiding arrangement of the control piston comprises a separate guiding sleeve which is stationarily fastened to the pilot valve housing and which is provided with an upper guiding section which, for the axial guidance, corresponds with a passage bore in the control piston, and which, in addition, has a lower tube section of a smaller outside diameter adjoining the upper guiding section in order to guide the outgoing air flowing through an integrated axial bleeder duct over the area of the valve seat arrangement directly to the bleeder connection, and the distal end of the tube section has a fissured construction in order to ensure an unhindered outflow of the outgoing air emerging from the bleeder duct.

9. Electropneumatic control valve for a pneumatic brake system of a vehicle having a relay valve housing in which an axially adjustable control piston is arranged for actuating a valve seat arrangement which switches the compressed-air flow between at least one exterior brake line connection, a supply pressure connection as well as a bleeder connection, the control piston being axially guided via a coaxial guiding arrangement and being capable of being acted upon by a control pressure by way of at least one electromagnetic pilot valve for the axial adjustment, which pilot valve is accommodated in a pilot valve housing connected with the relay valve housing, wherein the guiding arrangement of the control piston comprises a separate guiding sleeve which is stationarily fastened to the pilot valve housing and which is provided with an upper guiding section which, for the axial guidance, corresponds with a passage bore in the control piston, and which, in addition, has a lower tube section of a smaller outside diameter adjoining the upper guiding section in order to guide the outgoing air flowing through an integrated axial bleeder duct over the area of the valve seat arrangement directly to the bleeder connection, and for maximizing the flow cross-section of the bleeder duct, the wall of the tube section is reinforced by way of a rib arrangement, so that the required wall thickness as well as the total diameter in the area of the tube section are minimal.

10. Electropneumatic control valve according to claim 9, wherein the rib arrangement consists of at least four integral ribs which extend axially along the exterior wall of the tube section, are aligned essentially axially parallel with respect to the tube section and, in the cross-sectional view, are arranged at an equal distance from one another.

11. An electropneumatic control valve for a pneumatic brake system of a vehicle, comprising:

a valve housing including relay valve housing portion and a pilot valve housing portion; and a control piston slidably disposed in the valve housing and adapted to be actuated by a pilot valve arrangement in the pilot valve housing to actuate an interior valve seat arrangement in the relay valve housing in order to switch compressed air flow between an exterior brake line connection, a supply pressure connection and a bleeder connection, wherein the control piston includes an axial central passage which cooperates with a coaxial guiding sleeve affixed to the pilot valve housing, the guiding sleeve includes an upper guiding section, a lower tube section with an outer diameter smaller than an outer diameter of the upper guiding section, and an axial guiding sleeve bleeder duct in communication with a pilot valve housing bleeder duct, and the lower tube section cooperates with the relay valve interior valve seat arrangement to guide air flowing through the guiding sleeve bleeder duct to the bleeder connection.

12. The electropneumatic control valve of claim 11, further comprising:

a sound absorber which minimizes sound caused by air flow through the bleeder connection.

13. The electropneumatic control valve of claim 11,
wherein the guiding sleeve comprises a material with a low coefficient of sliding friction at least in the area of the upper guiding section.

14. The electropneumatic control valve of claim 13,
wherein the low friction material is a plastic material.

15. An electropneumatic control valve for a pneumatic brake system of a vehicle, comprising:
a valve housing including relay valve housing portion and a pilot valve housing portion; and
a control piston slidably disposed in the valve housing and adapted to be actuated by a pilot valve arrangement in the pilot valve housing to actuate an interior valve seat arrangement in the relay valve housing in order to switch compressed air flow between an exterior brake line connection, a supply pressure connection and a bleeder connection,
wherein
the control piston includes an axial central passage which cooperates with a coaxial guiding sleeve affixed to the pilot valve housing,
the guiding sleeve includes an upper guiding section, a lower tube section with an outer diameter smaller than an outer diameter of the upper guiding section, and an axial guiding sleeve bleeder duct in communication with a pilot valve housing bleeder duct,
the lower tube section cooperates with the relay valve interior valve seat arrangement to guide air flowing through the guiding sleeve bleeder duct to the bleeder connection, and
the guiding sleeve is affixed to the pilot valve housing by press-fit onto a hollow guide pin projecting from the pilot valve housing.

16. The electropneumatic control valve according to claim 15,
wherein the upper guiding portion of the guiding sleeve has a recess coaxial to the guiding sleeve bleeder duct, said recess having a larger diameter than the bleeder duct and shaped to receive the guide pin.

17. The electropneumatic control valve according to claim 16,
wherein at least two circumferential portions of the recess frictionally engage the guide pin.

18. An electropneumatic control valve for a pneumatic brake system of a vehicle, comprising:
a valve housing including relay valve housing portion and a pilot valve housing portion; and
a control piston slidably disposed in the valve housing and adapted to be actuated by a pilot valve arrangement in the pilot valve housing to actuate an interior valve seat arrangement in the relay valve housing in order to switch compressed air flow between an exterior brake line connection, a supply pressure connection and a bleeder connection,
wherein
the control piston includes an axial central passage which cooperates with a coaxial guiding sleeve affixed to the pilot valve housing,
the guiding sleeve includes an upper guiding section, a lower tube section with an outer diameter smaller than an outer diameter of the upper guiding section, and an axial guiding sleeve bleeder duct in communication with a pilot valve housing bleeder duct,
the lower tube section cooperates with the relay valve interior valve seat arrangement to guide air flowing through the guiding sleeve bleeder duct to the bleeder connection, and
a distal end of the lower tube section includes a step which engages a corresponding receiver in the relay valve housing.

19. An electropneumatic control valve for a pneumatic brake system of a vehicle, comprising:
a valve housing including relay valve housing portion and a pilot valve housing portion; and
a control piston slidably disposed in the valve housing and adapted to be actuated by a pilot valve arrangement in the pilot valve housing to actuate an interior valve seat arrangement in the relay valve housing in order to switch compressed air flow between an exterior brake line connection, a supply pressure connection and a bleeder connection,
wherein
the control piston includes an axial central passage which cooperates with a coaxial guiding sleeve affixed to the pilot valve housing,
the guiding sleeve includes an upper guiding section, a lower tube section with an outer diameter smaller than an outer diameter of the upper guiding section, and an axial guiding sleeve bleeder duct in communication with a pilot valve housing bleeder duct,
the lower tube section cooperates with the relay valve interior valve seat arrangement to guide air flowing through the guiding sleeve bleeder duct to the bleeder connection, and
the lower tube section distal end includes a transverse air flow passage which intersects the guiding sleeve bleeder duct.

20. An electropneumatic control valve for a pneumatic brake system of a vehicle, comprising:
a valve housing including relay valve housing portion and a pilot valve housing portion; and
a control piston slidably disposed in the valve housing and adapted to be actuated by a pilot valve arrangement in the pilot valve housing to actuate an interior valve seat arrangement in the relay valve housing in order to switch compressed air flow between an exterior brake line connection, a supply pressure connection and a bleeder connection,
wherein
the control piston includes an axial central passage which cooperates with a coaxial guiding sleeve affixed to the pilot valve housing,
the guiding sleeve includes an upper guiding section, a lower tube section with an outer diameter smaller than an outer diameter of the upper guiding section, and an axial guiding sleeve bleeder duct in communication with a pilot valve housing bleeder duct,
the lower tube section cooperates with the relay valve interior valve seat arrangement to guide air flowing through the guiding sleeve bleeder duct to the bleeder connection, and
the lower tube section includes outer reinforcing ribs.

21. The electropneumatic control valve according to claim 20,
wherein the ribs include a plurality of axial ribs disposed at substantially equal distances from one another about the outer periphery of the lower tube section.

22. The electropneumatic control valve according to claim 21,
wherein the plurality of axial ribs comprise at least four axial ribs.

* * * * *